United States Patent

Winslow

[15] 3,646,863
[45] Mar. 7, 1972

[54] ADAPTIVE UNDERWATER CAMERA
[72] Inventor: John S. Winslow, Altadena, Calif.
[73] Assignee: Tetra Tech Inc., Pasadena, Calif.
[22] Filed: June 25, 1969
[21] Appl. No.: 836,329

[52] U.S. Cl. .................................................95/11, 95/16
[51] Int. Cl. .............................................G03b 17/08
[58] Field of Search...........................95/12.5, 11, 15, 16, 17

[56] References Cited

UNITED STATES PATENTS 3,139,015   6/1964   Crockwell....................................95/17

*Primary Examiner*—John M. Horan
*Attorney*—Allen E. Botney

[57] ABSTRACT

The present invention is an underwater camera which, because of its narrow field of view, looks only at the illuminated portion of an object. The camera includes a servosystem by means of which the camera is continuously positioned to follow the illuminated portion of the object.

6 Claims, 4 Drawing Figures

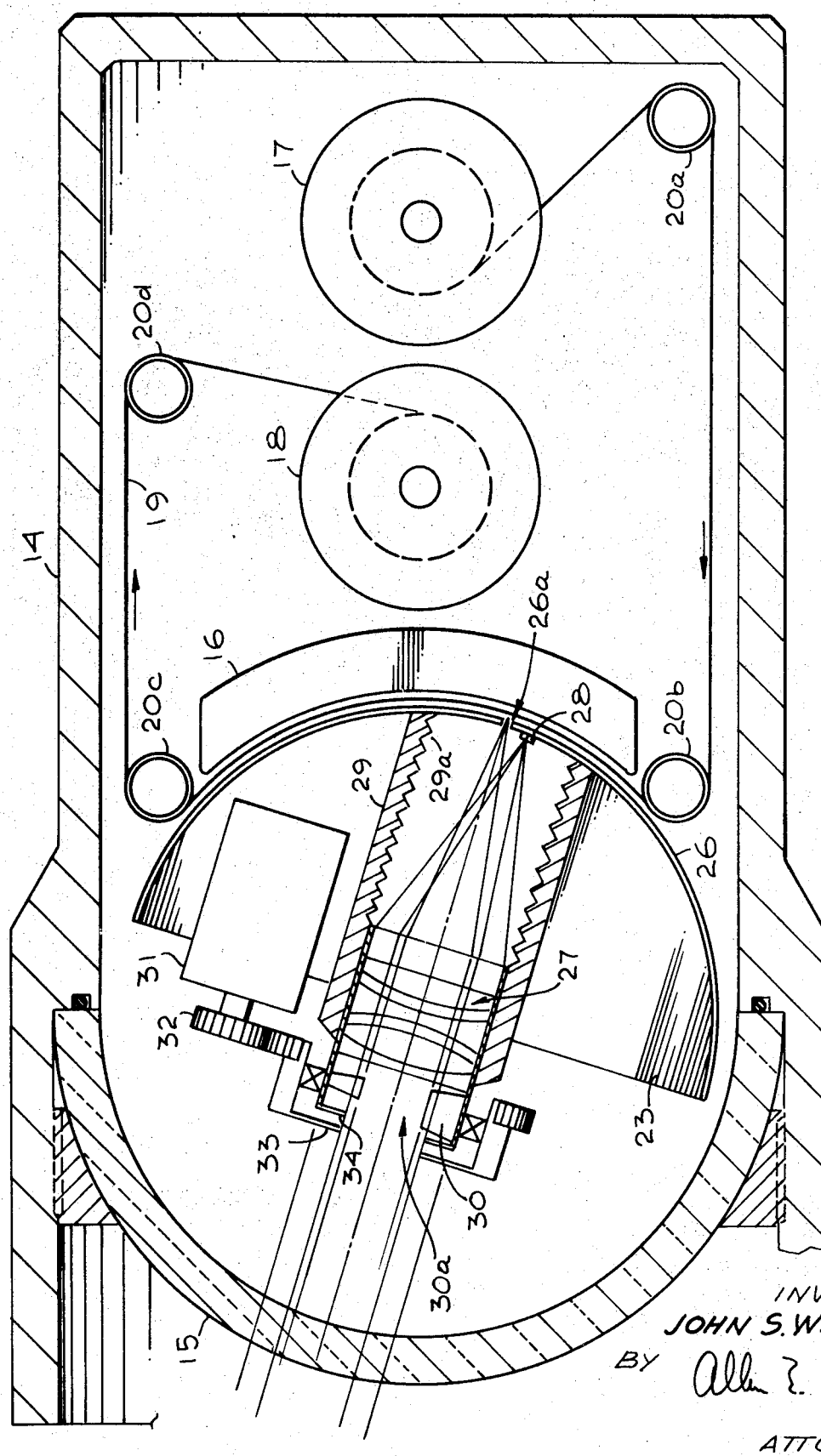

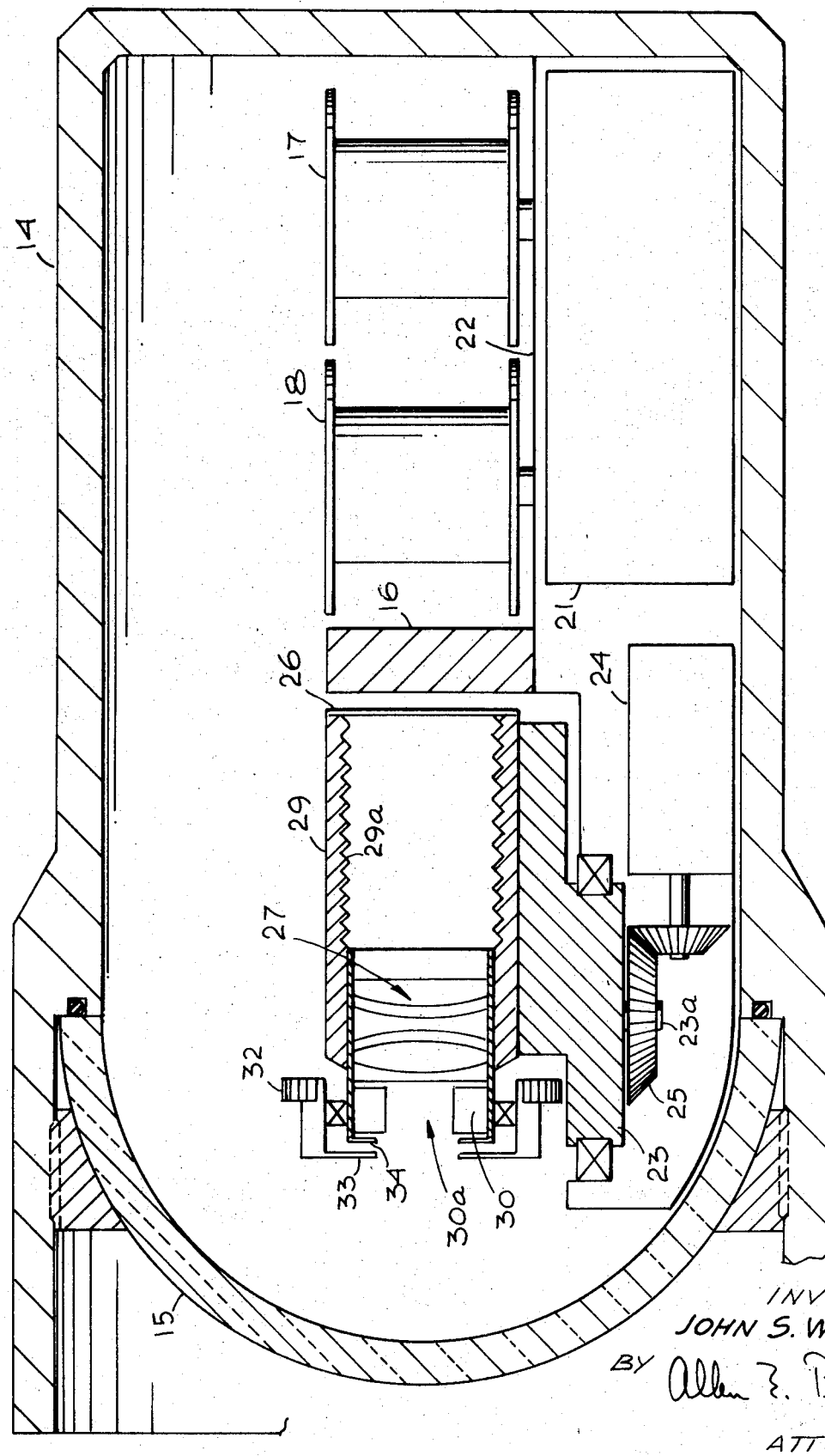

ADAPTIVE UNDERWATER CAMERA

The present invention relates to cameras in general, and more particularly relates to cameras adapted for underwater photography.

It is considered by those skilled in the art that volume scanning is the best means for photographing objects in turbid water with a satisfactory degree of quality. By way of explanation, in volume scanning a narrow beam of light is swept across the object while a camera with a correspondingly narrow field of view looks only at the illuminated portion of the object and thereby avoids "seeing" much of the backscattered light from the turbid water.

It is, therefore, an object of the present invention to provide a camera for underwater photography.

It is another object of the present invention to provide a camera that photographs by the technique of volume scanning.

It is a further object of the present invention to provide a panoramic camera for underwater use whose field of view is servoed to follow the beam reflected by the object.

It is an additional object of the present invention to provide a volume-scanning type of underwater camera with which the operator need not estimate the range of the object.

The novel features which are believed to be characteristic of the invention, both as to its organization and method of operation, together with further objects and the advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIG. 2A is a top view of a preferred embodiment of a camera according to the present invention;

FIG. 2B is a side view of the camera illustrated in FIG. 2A; and

Figure 1:
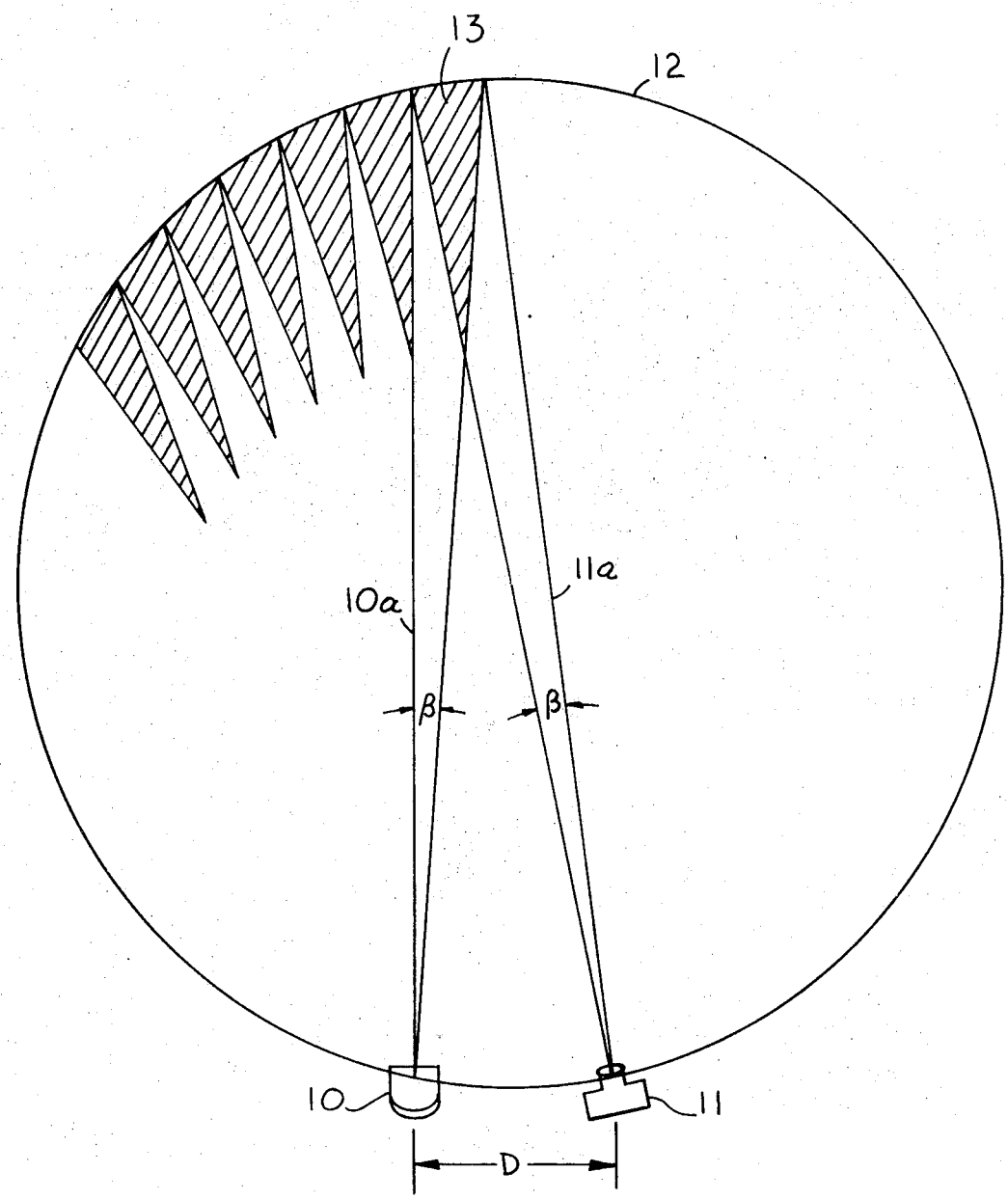
FIG. 1 illustrates the general principals of an imaging system that incorporates a camera according to the present invention.

For a consideration of the invention in detail, reference is now made to FIG. 1 of the drawings wherein a volume-scanning-imaging system that is positioned underwater is shown to include a fan beam light source 10 and a camera 11 spaced from the light source by some distance "D". Briefly stated, light source 10 directs its beam, designated 10a, toward some distant object to be photographed and the beam of light reflected therefrom, designated 11a, is received by the camera. In order to suitably scan the object with the light, beam 10a is rotated at a constant angular velocity and, therefore, in accordance with the camera's mode of operation, the camera's field of view is rotated at the same constant angular velocity. It will be recognized that such an arrangement can image a wide object by synchronizing the motion of the light source and the camera to make a series of strip images of angular width beta, beta being the beam angle. Since a certain amount of scattering of light will take place, the angle beta is made quite narrow, for example about 4° to reduce the quantity of backscattered illumination viewed by the camera in relation to the desired reflection from the object being viewed. For purposes of simplicity in illustrating and explaining g the basic principles involved, the reflecting object 12 is shown to be circular in its configuration, with the result that the successive scattering volumes are hatched triangles 13 as shown in the figure.

Considering now the camera itself, reference is made to FIGS. 1 A and 1 B wherein the camera is shown to include a watertight housing structure or case 14 that is a hollow cylindrically shaped structure open at one end and closed at the other end. The open end of structure 14 is enclosed with a hemispherically shaped dome 15 that is made with a transparent material, such as glass, plastic, or the like, of optical quality. The casing 14, on the other hand, may be made of metal or some other opaque material that is sturdy. Mounted within the casing is a block or wall 16 that is curved along the arc of a circle in its configuration, this block generally dividing the casing 14 into two chambers, a forward chamber wherein the electro-optical-mechanical apparatus is housed and a rear chamber wherein the film reels and the power pack is preferably kept.

With respect to the above said rear chamber, a pair of reels are rotatably mounted in it, one being the film supply reel 17 and the other being the takeup reel 18. The film is designated 19 and is wound on a plurality of rollers 20a–20b as it passes from reel 17 to reel 18. Beneath the reels is the power pack which, in the present instance, comprises one or more batteries 21. As can be seen from the figure, this rear chamber may be divided into two compartments by a partition 22, the batteries preferably being mounted in the lower compartment and the reels in the upper compartment.

Referring now to the abovesaid forward chamber, there is mounted therein a turntable 23 and a servomotor 24 for turning the turntable through a gearing arrangement 25, the turntable being rotated around a shaft 23a whose axis of rotation is at the dome's center of curvature. Rigidly or fixedly mounted on this turntable 23 is a shutter 26 in front of which is mounted a lens arrangement generally designated 27. As can be seen from FIG. 1 A, shutter 26 comprises a frame that is shaped or formed along a circular arc and which has an aperture in the form of a narrow slot 26a through which the reflected beam of light passes on its way to the film 19. As can also be seen from FIG. 1 A, rollers 20b and 20c are positioned at opposite ends of block 16 with the strip of film that extends 5 between these rollers being interposed between this block 16 and shutter 26. The film is held both by block 16 and shutter 26 so that it 65 curved about the lens' center of rotation, with a radius equal to the focal length. The slot 26a is near the focal plane and parallel to the above-said axis of rotation, and defines the instantaneous field of view. Since the shutter is affixed to turntable 23, it obviously moves with the turntable, with the result that as the turntable rotates, the light passing through the slot or aperture scans the abovesaid strip of film for recordation on successive portions of it. This slot and the lens 27 rotate as a unit while the film is being exposed. Completing the overall shutter mechanism is a split silicon photodetector cell 28 that is mounted to one side of the shutter aperture and in the proximity thereof.

Extending forwardly from shutter 26 is a hollow cylindrically shaped member 29 whose rear end is covered or enclosed by the shutter, the slot 26a being located where the longitudinal axis of member 29 intersects the shutter. As may be noted from the figures under discussion, the inside surface 29a of that portion of the wall of member 29 that lies between shutter 26 and lens arrangement 27 is corrugated, the corrugations being provided to minimize the occurrence of reflections from the wall that may interfere with or adversely affect the quality of the pictures taken. Member 29 extends forwardly beyond lens arrangement 27 wherein a prism arrangement 30 is mounted and through which the outermost portions of the reflected light beam passes for focusing on silicon cell 28. More particularly, the prism 30 is designed to have a relatively narrow apex angle, 12° for example, a hole 30a being bored through the center of the prism to allow the main portion of the beam to pass, undeflected, through the center of the lens arrangement 27 and to be brought to a focus on the film after passing through the slot or aperture. However, the rays that pass through the prism are brought to a focus to one side of the aperture (about 6° to one side) and, therefore, fall on the split silicon 40028. Associated with and coupled to turntable 23 and the apparatus mounted thereon is a motor 31 which, through a gearing arrangement 32, drives a set of rotating chopper blades 33 positioned in front of member 29. Between these rotating chopper blades 33 and prism 30 are a set of fixed chopper blades 34, these latter blades, in the embodiment shown, being integral with and extending from the front end of member 29. For reasons that will appear more clearly later, the light beam that passes through prism 30 is chopped by blades 33 so as to produce a 400-cycle pulsed output beam.

Figure 3:
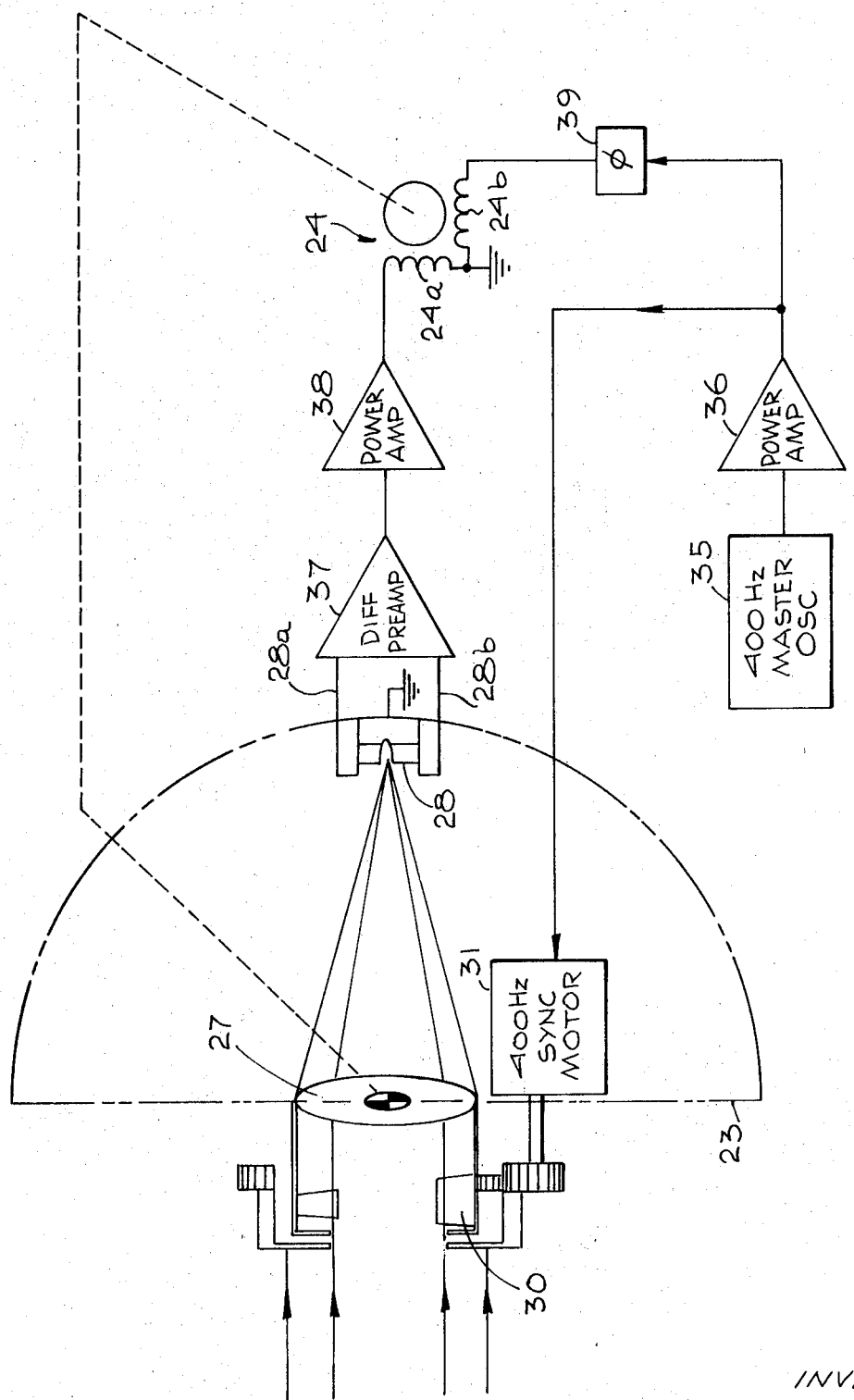
FIG. 3 is a schematic circuit diagram of a servosystem for the camera shown in FIGS. 2 A and 2 B.

A schematic circuit diagram of the servosystem for the described camera apparatus is shown in FIG. 3 and includes a 400-cycle master oscillator 35 connected to a power amplifier 36 that feeds chopper motor 31. The two outputs 28a and 28b of the split photovoltoic cell 28 are connected to a difference amplifier 37 whose output signal, both as to magnitude and sense, depends upon the magnitude of the respective signals on output lines 28a and 28b and, therefore, on the surface area of cell 28 whereat the chopped beam is incident. The difference amplifier is connected to a power amplifier 38 whose output is fed to one of the two coils, namely, coil 24a of servomotor 24. The other of these two coils, namely coil 24b is fed by power amplifier 36 through a phase shifter circuit 39 whose function it is to compensate for any undesirable phase shifts introduced by circuit components, as is usually the case.

Considering now the operation of the camera, it should be mentioned at the outset that the function of the servo system and the apparatus it controls is to continuously adjust the position of the turntable so that the light passing through prism 30 will impinge upon the center of photocell 28, that is to say, upon the split thereof. When this occurs, that portion of the beam that passes through prism hole 30a will then be incident upon slot or aperture 26a and will pass through to film 19. It should also be mentioned that under such circumstances, the output from difference amplifier 37 is reduced to zero which means, in turn, that servomotor 24 is inactive. On the other hand, if the chopped beam of light passing through prism 30 impinges on one side or the other of the split of cell 28, which means, basically, that the reflected beam is not centered on aperture 26a, then in that event a signal is developed at the output of difference amplifier 37. Whether this signal is positive or negative depends on whether the input to the amplifier is applied on line 28a or 28b and it will be recognized that this, in turn, depends upon which side of the photocell the light impinges upon, as was previously indicated. Needless to say, the signal out of the difference amplifier produces an imbalance in coils 24a and 24b, with the result that servo motor 24 is activated to rotate turntable 23 in a direction that will restore the beams to their central positions with respect to both photocell and aperture. Of course, this process goes on continuously and smoothly as the beam from light source 10 scans the object to be photographed. Accordingly, as has been shown, the camera effectively tracks the light beam reflected from the object, with the result that the camera is continuously pointing towards that portion of the object that is being illuminated as the light beam from the light source sweeps across it.

Although a particular arrangement of the invention has been illustrated and described above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. Camera apparatus for photographing an object illuminated by a beam of light that is being swept across it, said apparatus comprising: a strip of film mounted in the focal plane of the camera apparatus and on which an image of said object is to be recorded; a rotatably mounted camera section for focusing the light beam reflected from the object through an aperture therein and onto said film; and means for tracking said reflected light beam, said means including a device that is receptive of a portion of said reflected light beam and operable in response thereto to produce an output signal whose magnitude and sense substantially correspond to the shift of said reflected beam from the center of said aperture, and additional means operable in response to said output signal for rotating said camera section so that the illuminated portion of the object is always within its field of view.

2. The camera apparatus defined in claim 1 wherein said camera section includes a rotatably mounted turntable, a lens arrangement mounted on said turntable at the axis of rotation thereof, a shutter frame mounted on said turntable and having an aperture therethrough through which said reflected light beam is focused on said film, said lens arrangement and said shutter frame being fixed to said turntable and rotatable therewith; and wherein said means includes a device that is receptive of a portion of said reflected light beam and operable in response thereto to produce an output signal whose magnitude and sense substantially corresponds to the shift of said reflected beam from the center of said aperture.

3. The camera apparatus defined in claim 1 wherein said means includes a device that is receptive of a portion of said reflected light beam and operable in response thereto to produce an output signal whose magnitude and sense substantially corresponds to the shift of said reflected beam from the center of said aperture; an oscillator that produces a reference signal; and a servomotor coupled to said device and to said oscillator and operable in response to the signals therefrom to rotate said turntable in an amount and in a direction corresponding to the differences therebetween.

4. The camera apparatus defined in 1 wherein said camera section includes a rotatably mounted turntable; a lens arrangement mounted on said turntable at the axis of rotation thereof, a shutter frame mounted on said turntable and having an aperture therethrough through which said reflected light beam is focused on said film, said lens arrangement and said shutter frame being fixed to said turntable and rotatable therewith; and wherein said means includes a split photodetector device mounted on said shutter frame adjacent said aperture therethrough, a prism having a centrally disposed hole therethrough mounted in front of said lens arrangement, said prism being operable to focus the peripheal portion of said reflected light bean onto said split photodetector which, in response thereto, produces output signals whose magnitude and sense correspond to the degree said focused beam is not centered on said split, and a servosystem operable in response to said signals to center said focused beam on the split of said photodetector.

5. The camera apparatus defined in claim 2 wherein said device includes a split silicon photodetector mounted on said shutter frame adjacent said aperture therethrough, a prism having a centrallydisposed hole therethrough mounted in front of said lens arrangement, said prism being operable to focus the periphery of said reflected light beam toward said split silicon photodetector, a difference amplifier circuit coupled to the outputs of said detector, and apparatus for chopping the light applied to said prism.

6. The camera apparatus defined in claim 5 wherein said apparatus includes fixed and rotatable chopper blades mounted in front of said prism and in the path of the peripheal portion of said reflected beam, and a motor driven to rotate said rotatable chopper blades at a predetermined speed.

* * * * *